United States Patent
Honickman et al.

(10) Patent No.: US 11,668,414 B2
(45) Date of Patent: Jun. 6, 2023

(54) DUAL METAL ADAPTER

(71) Applicant: LC ADVANCED MOTOR TECHNOLOGY CORPORATION, New York, NY (US)

(72) Inventors: Matthew Honickman, Potsdam, NY (US); Ryan W. Loar, Philadelphia, NY (US)

(73) Assignee: LC Advanced Motor Technology Corporation, New York, NY (US)

( * ) Notice: Subject to any disclaimer, the term of this patent is extended or adjusted under 35 U.S.C. 154(b) by 504 days.

(21) Appl. No.: 16/711,517

(22) Filed: Dec. 12, 2019

(65) Prior Publication Data

US 2021/0180729 A1      Jun. 17, 2021

(51) Int. Cl.
  *F16L 13/08*    (2006.01)
  *B23K 31/02*    (2006.01)

(52) U.S. Cl.
  CPC ............ *F16L 13/08* (2013.01); *B23K 31/027* (2013.01)

(58) Field of Classification Search
  CPC .... B23K 31/027; F16L 47/03; F16L 13/0218; F16L 13/0227; F16L 13/0236; F16L 13/08; F16L 13/02
  See application file for complete search history.

(56) References Cited

U.S. PATENT DOCUMENTS

| | | | |
|---|---|---|---|
| 2,055,276 A * | 9/1936 | Brownsdon | F16L 13/08 285/289.5 |
| 2,224,145 A * | 12/1940 | Dugan | F16L 13/08 228/229 |
| 2,241,517 A * | 5/1941 | Moise | B23K 1/20 285/55 |
| 3,032,870 A * | 5/1962 | Rohrberg | F16L 13/08 285/332 |
| 3,286,341 A * | 11/1966 | Miller | F16L 21/022 228/178 |
| 3,308,532 A * | 3/1967 | Long | F16L 13/08 228/234.3 |
| 4,732,412 A * | 3/1988 | van der Linden | B29C 61/0616 285/123.17 |
| 4,795,078 A * | 1/1989 | Kuroki | B23K 31/027 228/175 |
| 6,065,783 A * | 5/2000 | Chiarelli | F16L 13/11 285/915 |
| 6,514,631 B1 * | 2/2003 | Yamamoto | C22C 1/10 428/685 |
| 6,595,559 B1 * | 7/2003 | Readman | F16L 13/141 285/382 |

FOREIGN PATENT DOCUMENTS

| | | | | |
|---|---|---|---|---|
| DE | 2835277 A1 | * | 2/1980 | |
| FR | 2276528 A | * | 2/1976 | ............. B23K 1/20 |
| JP | 2001116182 A | * | 4/2001 | ............. F16L 47/03 |

* cited by examiner

*Primary Examiner* — Zachary T Dragicevich
*Assistant Examiner* — Alexander T Rufrano
(74) *Attorney, Agent, or Firm* — Banner & Witcoff, Ltd.

(57) ABSTRACT

An assembly includes at least one member having first and second ends. A dual metal adapter for connecting to the at least one member includes an inner tube for receiving and contacting the first end of the at least one member and being formed from a first metal having a first resistivity. An outer tube extends over the inner tube and is secured thereto. The outer tube is formed from a second metal having a second resistivity greater than the first resistivity. The first end of the at least one member is metallurgically bonded to the inner tube.

31 Claims, 4 Drawing Sheets

DUAL METAL ADAPTER

TECHNICAL FIELD

The present invention relates generally to metal adapters, and specifically to a dual metal adapter for resistive heating applications.

BACKGROUND

Several techniques are available for joining metal parts together, including resistive brazing/soldering and spot welding. Both techniques use high current to heat parts. More specifically, brazing/soldering uses a filler metal that melts to create joints whereas spot welding melts the base materials to create a joint.

For each technique, high current flows into the top conductor of the tool, through one electrode, through the parts being joined, out the other electrode, and then out of the bottom conductor. Most of the heat is generated in the electrodes and then conducts into the parts being joined, thereby indirectly heating the parts. As a result, the electrodes get very hot and eventually wear. By definition, since most the heat is generated in the electrodes, the electrodes need to be hotter than the parts to be joined and heat must be able to flow out of the electrodes into the parts.

SUMMARY

In one example an assembly includes at least one member having first and second ends. A dual metal adapter for connecting to the at least one member includes an inner tube for receiving and contacting the first end of the at least one member and being formed from a first metal having a first resistivity. An outer tube extends over the inner tube and is secured thereto. The outer tube is formed from a second metal having a second resistivity greater than the first resistivity. The first end of the at least one member is metallurgically bonded to the inner tube.

In another example, an assembly includes a first tubular member having first and second ends and a second tubular member having first and second ends. A dual metal adapter for connecting to the first ends of the first and second members includes an inner tube for receiving and contacting the first ends of the first and second members and being formed from a first metal having a first resistivity. An outer tube extends over the inner tube and is secured thereto. The outer tube is formed from a second metal having a second resistivity greater than the first resistivity. Pockets are provided between ends of the inner tube and ends of the outer tube. Filler metal is positioned within each of the pockets. The first ends of the first and second members are metallurgically bonded to the inner tube by the filler metal in response to heat applied to the assembly.

In another example, a dual metal adapter for connecting to an end of at least one member includes an inner tube for receiving and contacting the end of the at least one member and being formed from a first metal having a first resistivity. An outer tube extends over the inner tube and is secured thereto. The outer tube is formed from a second metal having a second resistivity greater than the first resistivity. The at least one member is metallurgically bonded to the inner tube in response to heat applied to the outer tube. The first and second metals have melting points greater than about 800° C.

In another example, a method of forming an assembly includes inserting an inner tube formed from a first metal having a first resistivity into an outer tube formed from a second metal having a second resistivity greater than the first resistivity. The inner and outer tubes are secured together. At least one member having first and second ends is inserted into the inner tube. The first end of the at least one member is metallurgically bonded to the inner tube.

Other objects and advantages and a fuller understanding of the invention will be had from the following detailed description and the accompanying drawings.

DETAILED DESCRIPTION

The present invention relates generally to metal adapters, and specifically to a dual metal adapter for resistive heating applications. The dual metal adapter can be used in a variety of applications, including forming liquid cooling devices for rotary electric machines. In such applications, the adapter functions as a fluid coupling. Example cooling devices are shown and described in U.S. application Ser. No. 13/855,801, filed Apr. 3, 2013 and Ser. No. 15/394,522, filed Dec. 29, 2016, and U.S. Pat. No. 10,312,760, the entirety of which are incorporated by reference herein.

Figure 1:
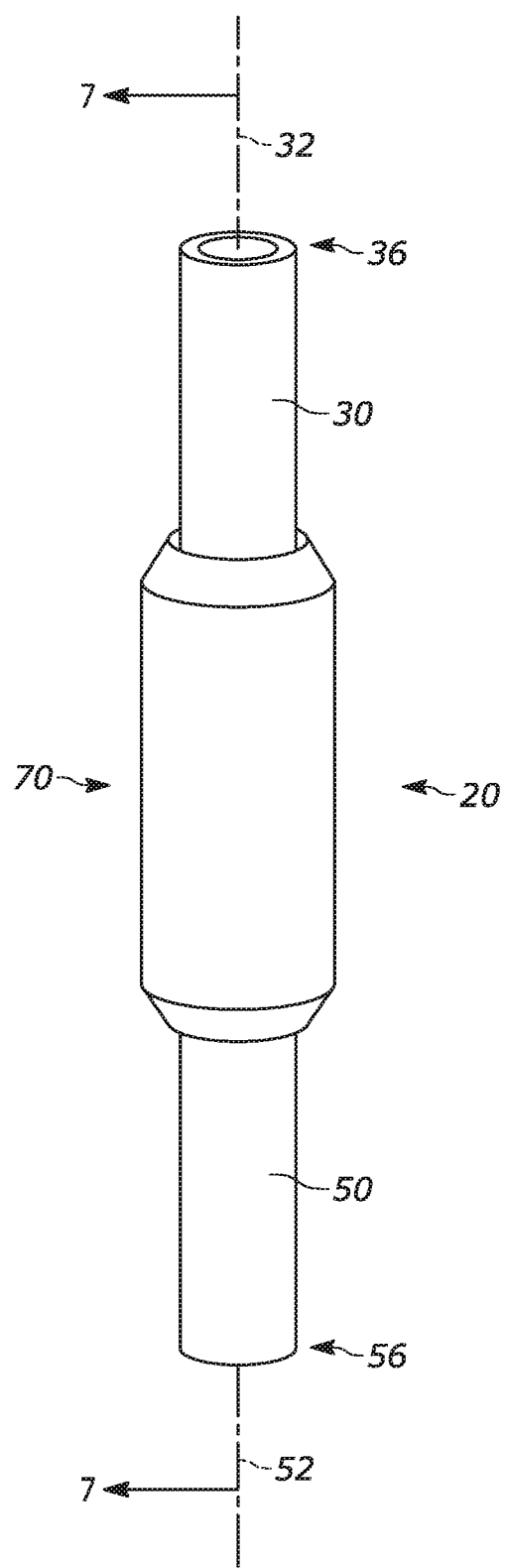
FIG. 1 is a schematic illustration of an example dual metal adapter assembly.

An example dual metal adapter 70 and assembly 20 formed therefrom are shown in FIG. 1. The assembly 20 includes at least one member metallurgically bonded to the adapter 70. As shown, first and second members 30, 50 are metallurgically bonded to the adapter 70 and extend in opposite directions therefrom. The assembly 20 could, however, include a single member metallurgically bonded to the adapter 70 and extending therefrom (not shown).

Figure 2:
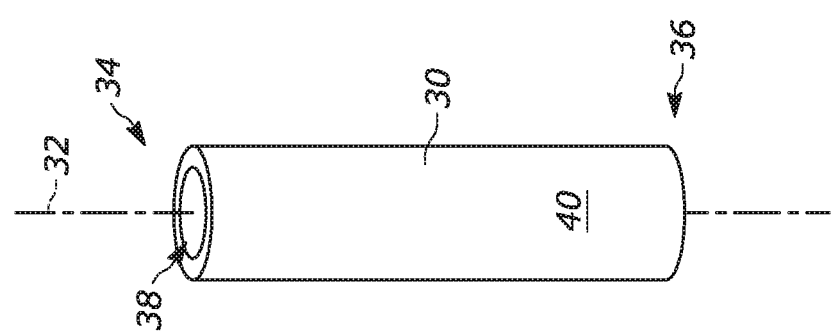
FIG. 2 is a front view of a first member of the assembly.

The first and second members 30, 50 can be tubular (as shown) or solid (not shown). For instance, the first member 30 can be a tubular member fluidly connected to a fluid manifold in a rotary electric machine and the second member 50 can be a tubular member fluidly connected to an in-slot cooling device in the rotary electric machine (not shown). Referring to FIG. 2, the first member 30 is elongated and extends along a centerline 32 from a first end 34 to a second end 36. A passage 38 extends the entire length of the first member 30. The first member 30 includes an outer surface 40.

Figure 3:
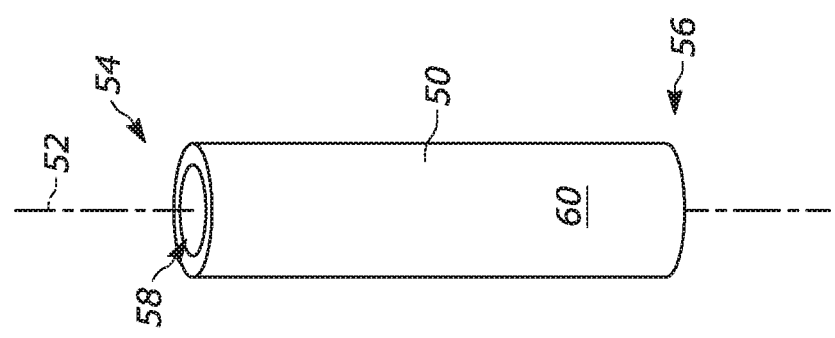
FIG. 3 is a front view of a second member of the assembly.

The second member 50 (FIG. 3) is elongated and extends along a centerline 52 from a first end 54 to a second end 56. A passage 58 extends the entire length of the second member 50. The second member 50 includes an outer surface 60. The first and second members 30, 50 can each be made of a metal having a relatively lower resistivity, e.g., copper or aluminum, compared to other metals. The longitudinal cross-section of the first and second members 30, 50 can be circular (as shown), triangular or polygonal (not shown).

The adapter 70 includes an outer tube 72 and an inner tube 92 provided therein. The inner and outer tubes 72, 92 can have any cross-sectional shape, e.g., circular, triangular, square, polygonal, etc. Although the inner and outer tubes are illustrated as separate, stand-alone tubes, it will be appreciated that the tubes can be defined and embodied in different manners. For example, the inner and outer tubes can be arranged in pairs each forming the leg of a T-shaped or H-shaped adapter. Alternatively, one or both of the inner and outer tubes can be formed in or defined by a block of material, e.g., an end cap or fluid manifold. For instance, the outer tube can constitute a tubular surface defining a passage extending through or into a solid block of material and the inner tube can be inserted therein.

Figure 4:
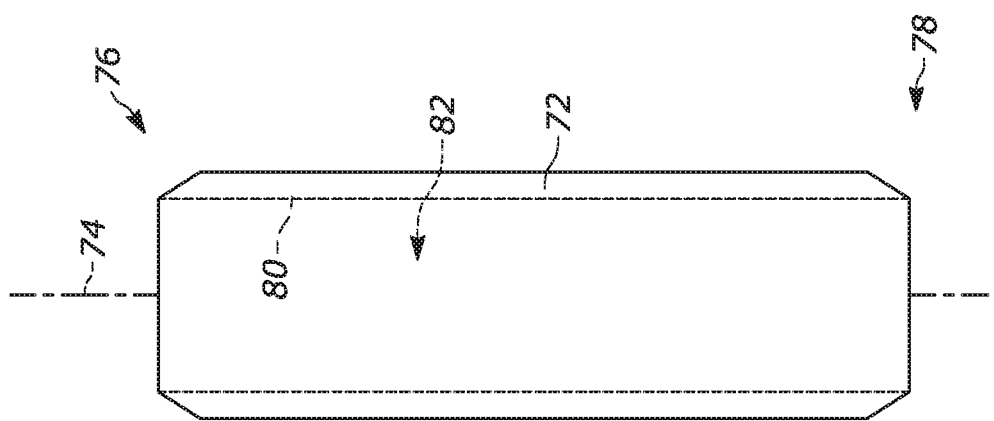
FIG. 4 is a front view of an outer tube of the assembly.

In the example shown in FIG. 4, the outer tube 72 extends along a centerline 74 from a first end 78 to a second end 76. An inner surface 80 defines a passage 82 extending the entire length of the outer tube 72. Alternatively, the passage 82 can terminate prior to the second end 76 (not shown). The outer tube 72 is made of a metal having a first resistivity. This can include, for example, steel, stainless steel, etc. The inner surface 80 of the outer tube 72 can also be coated, plated or otherwise provided with a layer of copper (not shown).

Figure 5:
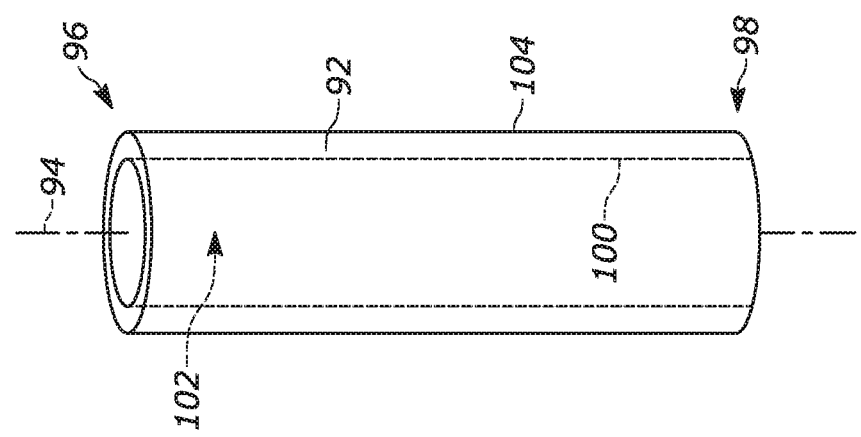
FIG. 5 is a front view of an inner tube of the assembly.

The inner tube 92 (FIG. 5) extends along a centerline 94 from a first end 96 to a second end 98. An inner surface 100 defines a passage 102 extending the entire length of the inner tube 92. The inner surface 100 has the same longitudinal cross-sectional shape as the first and second member 30, 50. The inner tube 92 includes an outer surface 104 having the same longitudinal cross-sectional shape as the passage 82 of the outer tube 72. The inner tube 92 is made of a metal having a second resistivity less than the first resistivity. This can include, for example, copper or aluminum. The inner and outer tubes 72, 92 can be formed from one or more materials having a melting point greater than about 800° C.

Figure 6:
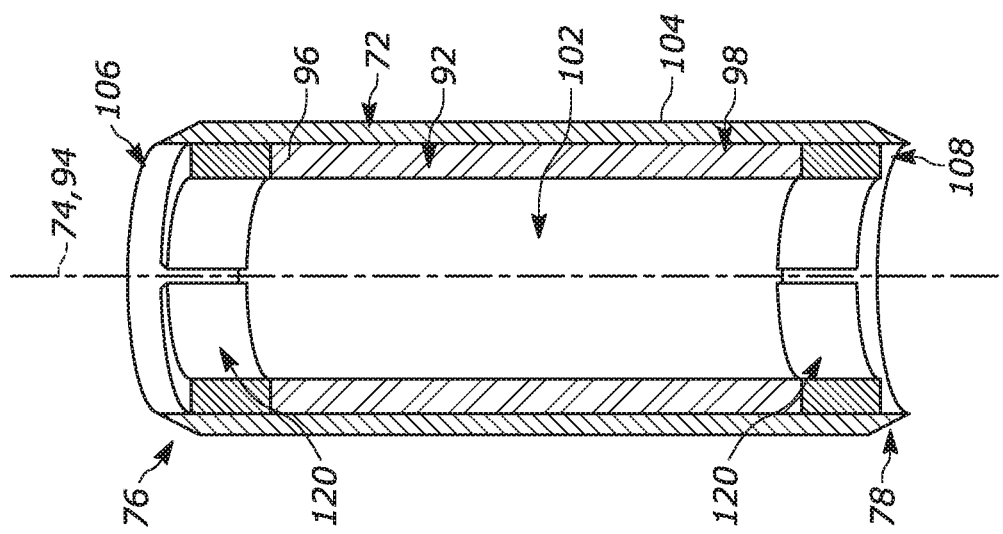
FIG. 6 is a longitudinal section view of the first and inner tubes assembled into the adapter of FIG. 1.

Referring to FIG. 6, the inner tube 92 is positioned within the passage 82 of the outer tube 72. The inner tube 92 is shorter than the outer tube 72 such that a pocket 106 is defined in the passage 82 between the first ends 76, 96 of the tubes 72, 92. Another pocket 108 is defined in the passage 82 between the second ends 78, 98 of the tubes 72, 92. The outer surface 104 of the inner tube 92 and the inner surface 80 of the outer tube 72 are configured such that the tubes are tightly held together via friction fit. Alternatively, the tubes 72, 92 can be crimped together or otherwise mechanically secured together.

Figure 7:
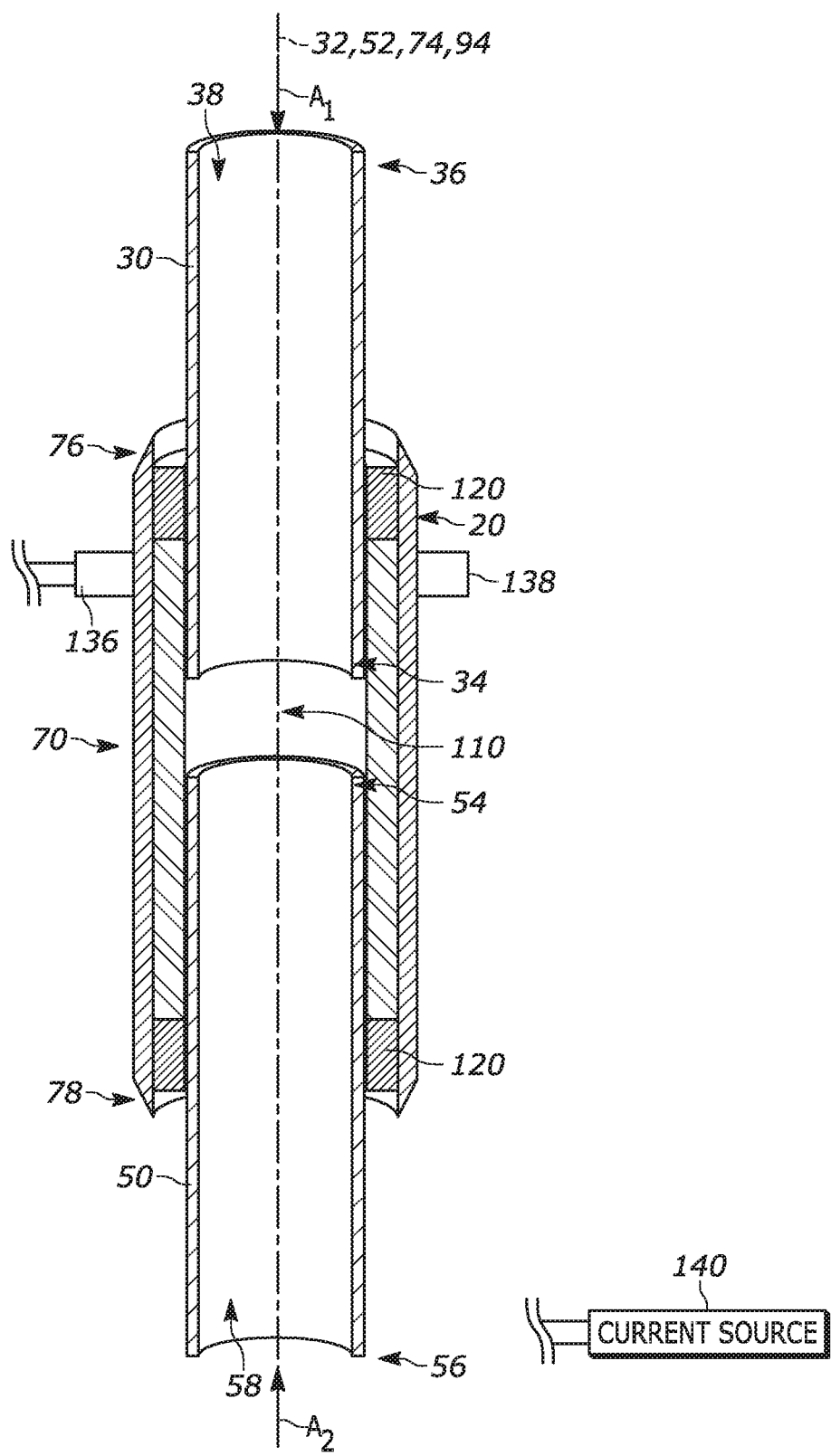
FIG. 7 is a section view of FIG. 1 taken along line 7-7.

Once the inner tube 92 is positioned within the passage 82 of the outer tube 72 (see FIG. 7), a filler metal 120 is positioned within each pocket 106, 108. The filler metal 120 can be a pre-formed brazing filler metal or a soldering filler metal. In any case, the filler metal 120 has a melting point lower than the melting point of both the inner tube 92 material and the outer tube 72 material. The filler metal 120 has a melting point lower than the melting point of both the first and second members 30, 50. In one instance, the filler metal 120 has a melting point between about 400° C. and about 800° C.

The first end 34 of the first member 30 is inserted axially into the passage 102 of the inner tube 92 in the manner indicated at $A_1$. The first end 54 of the second member 50 is inserted axially into the passage 102 of the inner tube 92 in the manner indicated at $A_2$. The first ends 34, 54 are positioned or held spaced from one another within the passage 82 by an axial gap 110. The outer surfaces 40, 60 of the first and second members 30, 50 contact the inner surface 100 of the inner tube 92.

A pair of electrodes 136, 138 are placed in contact with the exterior of the outer tube 72 and electrically connected to a current source 140 in a closed loop. The electrodes 136, 138 can be positioned on opposite sides, e.g., diametrically opposed, from one another (as shown) or at opposite ends 76, 78 of the outer tube 72 (not shown). The outer tube 72 can include flat or planar tabs (not shown) extending from the outer surface to facilitate connecting the electrodes 136, 138 thereto.

Regardless, current supplied to the electrode 136 and passes through the outer tube 72, the inner tube 92, and the electrode 138 in succession, then returns to the current source 140. In other words, current can flow back and forth between the electrodes 136, 138 and through the tubes 72, 92. Since the outer tube 72 is formed from a high resistivity material, heat is generated primarily in the outer tube as opposed to within the electrodes 136, 138. It will be appreciated that the outer tube 72 can alternatively be directly heated with a heat source (not shown) instead of applying current to the outer tube.

The heat conducts radially inwards from the outer tube 72 to the inner tube 92 and filler metals 120. As the current is further applied, the temperature rises until the filler metal 120 melts and metallurgically bonds the inner tube 92 to the first and second members 30, 50. Since the inner and outer tubes 72, 92 are mechanically connected together, such as via friction fit or via a crimp, the tubes 72, 92 and members 30, 50 become securely fastened to one another.

The dual metal adapter shown and described herein is advantageous in that it readily allows lower resistivity components, such as copper first and second members, to be metallurgically bonded to the adapter, which is not feasible with current heating systems. More specifically, since the outer tube has a higher resistivity than the inner tube, most heat generated in the adapter resides in the outer tube and conducts radially inward to the inner tube. This enables direct heating—and ultimately melting—of the braze/solder filler metal and metallurgically bonds the inner tube to the first and second members. This direct heating of the inner tube and filler metal by the outer tube (as opposed to indirect heating by the electrodes) enables less current to be used to secure the members to the adapter than is typically required in resistive heating applications. Moreover, since less current is used the electrodes reach lower temperatures, thereby prolonging their lifespan.

Additionally, the adapter shown and described herein utilizes only a few simply constructed components and does not require any moving parts to either secure the member(s) to the adapter or enable fluid flow between first and second tubular members secured to the adapter.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An assembly comprising:
    at least two members each including first and second ends;
    a dual metal adapter, separate from the at least two members, for connecting to the at least two members, comprising:
        an inner tube having an outer surface and a first inner surface, the first inner surface sized and shaped to receive and contact the first end of the at least two members and being formed from a first metal having a first resistivity; and an outer tube having a second inner surface, the second inner surface extending over the inner tube and contacting the outer surface of the inner tube, the outer tube being formed from a second metal having a second resistivity greater than the first resistivity;

each first end of the at least two members being metallurgically bonded to the inner tube.

2. The assembly recited in claim 1, wherein each first end of the at least two members is metallurgically bonded to the inner tube in response to heat applied to the outer tube.

3. The assembly recited in claim 1, wherein each of the at least two members include a passage for receiving fluid.

4. The assembly recited in claim 1, wherein each of the at least two members has a solid longitudinal cross-section.

5. The assembly recited in claim 1, wherein at least one of the at least two members is formed from copper.

6. The assembly recited in claim 1, wherein at least one of the at least two members is formed from aluminum.

7. The assembly recited in claim 1, wherein the inner tube is formed from copper and the outer tube is formed from stainless steel.

8. The assembly recited in claim 1, wherein the inner tube is formed from copper and the outer tube is formed from steel.

9. The assembly recited in claim 1, wherein the first and second metals have melting points greater than about 800° C.

10. The assembly recited in claim 1 further comprising: pockets provided between ends of the inner tube and ends of the outer tube; and filler metal positioned within each of the pockets, each first end of the at least two members being metallurgically bonded to the inner tube by the filler metal in response to current applied to the outer tube.

11. The assembly recited in claim 10, wherein the filler metal has a melting temperature between about 400° C. and 800° C.

12. The assembly recited in claim 10, wherein the filler metal comprises a brazing filler metal.

13. The assembly recited in claim 10, wherein the filler metal comprises a soldering filler metal.

14. The assembly recited in claim 10, wherein the filler metal has a melting point less than the melting points of both the first and second metals.

15. The assembly recited in claim 1, wherein the at least two members comprises first and second members extending from opposite ends of the adapter.

16. The assembly recited in claim 15, wherein each of the first and second member include a passage for receiving fluid.

17. The assembly recited in claim 1, wherein the adapter is free of moving parts.

18. A liquid-cooled rotary electric machine including the assembly recited in claim 1.

19. An assembly comprising:
a tubular first member including first and second ends;
a tubular second member including first and second ends; and
a dual metal adapter separate from the first member and the second member, and for connecting to the first ends of the first and second members, comprising:
an inner tube having an outer surface and a first inner surface, the first inner surface sized and shaped to receive and contact the first ends of the first and second members and being formed from a first metal having a first resistivity;
an outer tube having a second inner surface, the second inner surface extending over the inner tube and contacting the outer surface of the inner tube, the outer tube being formed from a second metal having a second resistivity greater than the first resistivity;
pockets provided between ends of the inner tube and ends of the outer tube; and
filler metal positioned within each of the pockets, the first ends of the first and second members being metallurgically bonded to the inner tube by the filler metal in response to heating the assembly.

20. The assembly recited in claim 19, wherein the first ends of the first and second members are metallurgically bonded to the inner tube by the filler metal in response to current applied to the outer tube.

21. A liquid-cooled rotary electric machine including the assembly recited in claim 19.

22. A dual metal adapter for connecting to an end of at least one member separate from the dual metal adapter, comprising:
an inner tube having an outer surface and a first inner surface, the first inner surface sized and shaped to receive and contact the end of the at least one member and being formed from a first metal having a first resistivity;
an outer tube having a second inner surface, the second inner surface extending over the inner tube and contacting the outer surface of the inner tube, the outer tube being formed from a second metal having a second resistivity greater than the first resistivity, the at least one member being configured to be metallurgically bonded to the inner tube in response to heat applied to the outer tube, the first and second metals having melting points greater than about 800° C.;
pockets provided between ends of the inner tube and ends of the outer tube; and
filler metal positioned within each of the pockets, the end of the at least one member being metallurgically bonded to the inner tube by the filler metal in response to current applied to the outer tube, the filler metal having a melting point less than the melting points of both the first and second metals.

23. The adapter recited in claim 22, wherein the at least one member is configured to be metallurgically bonded to the inner tube in response to current applied to the outer tube.

24. The adapter recited in claim 22, wherein the filler metal is a brazing filler metal.

25. The adapter recited in claim 22, wherein the filler metal is a soldering filler metal.

26. The adapter recited in claim 22, wherein the inner tube is formed from copper and the outer tube is formed from stainless steel.

27. The adapter recited in claim 22, wherein the inner tube is formed from copper and the outer tube is formed from steel.

28. The adapter recited in claim 22, wherein the inner and outer tubes are free of moving parts.

29. A liquid-cooled rotary electric machine including the adapter recited in claim 22.

30. A method of forming an assembly, comprising:
inserting an inner tube formed from a first metal having a first resistivity into an outer tube formed from a second metal having a second resistivity greater than the first resistivity;

securing the inner and outer tubes together such that an outer surface of the inner tube contacts a second inner surface of the outer tube;

inserting at least two members each having first and second ends in the inner tube such that the at least two members contact a first inner surface of the inner tube; and metallurgically bonding the first end of the at least one member to the inner tube.

31. The method of claim 30, wherein the step of metallurgically bonding the at least two members to the inner tube comprises heating the outer tube to melt a filler metal provided in a pocket provided between an end of the inner tube and an end of the outer tube.

* * * * *